US010330560B2

(12) United States Patent
Yung (10) Patent No.: US 10,330,560 B2
(45) Date of Patent: Jun. 25, 2019

(54) LIQUID LEAK DETECTION IN A LIQUID DISTRIBUTION SYSTEM

(71) Applicant: Weng-Chin Yung, Folsom, CA (US)

(72) Inventor: Weng-Chin Yung, Folsom, CA (US)

( * ) Notice: Subject to any disclaimer, the term of this patent is extended or adjusted under 35 U.S.C. 154(b) by 296 days.

(21) Appl. No.: 15/259,031

(22) Filed: Sep. 7, 2016

(65) Prior Publication Data

US 2018/0067011 A1    Mar. 8, 2018

(51) Int. Cl.
| | |
|---|---|
| *G01M 3/28* | (2006.01) |
| *H04W 4/38* | (2018.01) |
| *G01M 3/26* | (2006.01) |
| *F17D 5/02* | (2006.01) |
| *H04W 4/70* | (2018.01) |

(52) U.S. Cl.
CPC .............. *G01M 3/28* (2013.01); *H04W 4/38* (2018.02); *F17D 5/02* (2013.01); *G01M 3/26* (2013.01); *G01M 3/2815* (2013.01); *H04W 4/70* (2018.02); *Y02A 20/15* (2018.01)

(58) Field of Classification Search
None
See application file for complete search history.

(56) References Cited

U.S. PATENT DOCUMENTS

| | | | | |
|---|---|---|---|---|
| 7,007,545 | B1* | 3/2006 | Martinek | ............... G01M 3/243 73/40.5 A |
| 8,457,908 | B2 | 6/2013 | Patel | |
| 8,910,529 | B2 | 12/2014 | Nakada | |
| 9,250,105 | B2 | 2/2016 | Patel | |
| 2010/0204839 | A1* | 8/2010 | Behm | ................... E03B 7/071 700/282 |
| 2016/0241988 | A1* | 8/2016 | Slevin | .................... H04W 4/70 |
| 2017/0131174 | A1* | 5/2017 | Enev | ....................... E03B 7/07 |

FOREIGN PATENT DOCUMENTS

CN            104316115 A       1/2015

OTHER PUBLICATIONS

Sadeghioon et al., "SmartPipes: Smart Wireless Sensor Networks for Leak Detection in Water Pipelines" J. Sens. Actuator Netw. 2014, 3, 64-78.*

(Continued)

*Primary Examiner* — John C Kuan
(74) *Attorney, Agent, or Firm* — Muncy, Geissler, Olds & Lowe, P.C.

(57) ABSTRACT

Systems and methods relate to monitoring liquid pressure to detect liquid leaks based on a global sequence alignment technique. A monitoring device in a liquid distribution system obtains periodic samples at regular time intervals from a representative node of a liquid distribution system. Sequences of the samples are formed for a current time instance and for historical data comprising samples at the same node related to the same time instance, such as samples which are a day old and/or a week old. Global sequence alignment algorithms are implemented at a cloud computing service to determine if there are deviations from liquid pressure patterns at the node which are indicative of a liquid leak. Related notifications are provided wirelessly to user devices.

15 Claims, 9 Drawing Sheets

(56) References Cited

OTHER PUBLICATIONS

Allen et al., "Water Distribution System Monitoring and Decision Support Using a Wireless Sensor Network" 2013 14th ACIS International Conference on Software Engineering, Artificial Intelligence, Networking and Parallel/Distributed Computing, 2013 IEEE.*
Ratanamahatana et al. "Everything you know about Dynamic Time Warping is Wrong," Section 2.2, Lower Bounding the DTW Distance, Third Workshop on Mining Temporal and Sequential Data, Aug. 2004, Seattle, WA, USA.

* cited by examiner

| | | B1 | B2 | B3 | B4 | B5 | B6 | B7 | B8 | B9 | B10 |
|---|---|---|---|---|---|---|---|---|---|---|---|
| | 0 | -1 | -2 | -3 | -4 | -5 | -6 | -7 | -8 | -9 | -10 |
| A1 | -1 | 0 | X | X | X | -∞ | -∞ | -∞ | -∞ | -∞ | -∞ |
| A2 | -2 | X | 0 | X | X | X | -∞ | -∞ | -∞ | -∞ | -∞ |
| A3 | -3 | X | X | 0 | X | X | X | -∞ | -∞ | -∞ | -∞ |
| A4 | -4 | X | X | X | 0 | X | X | X | -∞ | -∞ | -∞ |
| A5 | -5 | -∞ | X | X | X | 0 | X | X | X | -∞ | -∞ |
| A6 | -6 | -∞ | -∞ | X | X | X | 0 | X | X | X | -∞ |
| A7 | -7 | -∞ | -∞ | -∞ | X | X | X | 0 | X | X | X |
| A8 | -8 | -∞ | -∞ | -∞ | -∞ | X | X | X | 0 | X | X |
| A9 | -9 | -∞ | -∞ | -∞ | -∞ | -∞ | X | X | X | 0 | X |
| A10 | -10 | -∞ | -∞ | -∞ | -∞ | -∞ | -∞ | X | X | X | 0 |

FIG. 2B

| Last one-hour data sampled | One-hour sampled one day ago | One-hour sampled one week ago | Suggested weight |
|---|---|---|---|
| Missing | N/A | N/A | 0.0 |
| Valid | Invalid/Missing | Invalid/Missing | 0.0 |
| Valid | Mismatched | Mismatched | 0.0 |
| Valid | Invalid/Missing | Mismatched | 0.1 |
| Valid | Invalid/Missing | Matched | 0.8 |
| Valid | Mismatched | Invalid/Missing | 0.3 |
| Valid | Matched | Invalid/Missing | 0.6 |
| Valid | Mismatched | Matched | 0.7 |
| Valid | Matched | Mismatched | 0.5 |
| Valid | Matched | Matched | 1.0 |

| # of weights generated within 1 hour | Suggested accumulated weight value |
|---|---|
| 7 | 6.10 |
| 8 | 6.80 |
| 9 | 7.47 |
| 10 | 8.00 |
| 11 | 8.50 |
| 12 | 8.40 |

LIQUID LEAK DETECTION IN A LIQUID DISTRIBUTION SYSTEM

FIELD OF DISCLOSURE

Disclosed aspects are directed to liquid leak detection in a liquid distribution system. More specifically, exemplary aspects are directed to detection of liquid leaks such as water leaks in a liquid distribution system such as a water distribution system based, at least in part on correlation of water pressure at specific nodes in a water distribution system with corresponding historical data.

BACKGROUND

There is a high incidence of accidental water leakage in various water distribution systems which may go undetected, thus exacerbating an ever increasing impact on the environment caused by water leakage and frustrating water conservation efforts. For example, households and residential neighborhoods may suffer from leaks which may develop in areas which are not easily detectable, which may lead to potential mold growth, property damage, as well as large water bills. Water leaks from broken sprinkler system or a ruptured water pipe, for example, can lead to significant water loss in a relatively short period of time.

Known approaches for detecting water leaks involve a process of classifying water consumption of each fixture (e.g., faucet, shower, toilet, etc.) in a household to develop pressure change signatures associated with opening and closing the fixtures. For example, Patel et al., U.S. Pat. No. 8,457,908, entitled, "Sensing events affecting liquid flow in a liquid distribution system" (hereinafter, "Patel") discloses monitoring pressure transients of fixtures based on their pre-identified signatures to detect whether there are deviations therefrom to suggest a water leak. However, Patel's approach may be best suitable in a controlled environment wherein interference from external factors such as external pressure fluctuation are artificially eliminated from affecting the water pressure of the fixtures in order to obtain the signatures; as such, these techniques may not be applicable to real time everyday settings where various external factors may affect the signatures of the fixtures. For example, water pressure fluctuation which may be introduced by changes in water consumption in a residential neighborhood can cause the pressure of the main water supply line to a household being monitored by Patel's system to drop; however such pressure drops from external factors may result in false positives of water leakage detection within the household because the water pressures of the various fixtures also correspondingly drop and deviate from their expected signatures. Typical pressure regulators prevent the incoming water pressure on the main supply line to a house from exceeding a particular set point, but do not prevent such water pressure drops in the neighborhood from being translated into a water pressure drop within individual households.

Furthermore, signature classification of fixtures is also frustrated in cases of compound fixtures comprising two or more component water fixtures because each component water fixture may have independent water consumption/usage characteristics which may not lend themselves to a well-defined signature for the compound fixtures. Moreover, the water consumption of some fixtures may be for a relatively small duration, e.g., washing one's hands at a sink can last for merely a few seconds, whereas taking a shower, running a dishwasher, or a washing machine, may last much longer. Thus, to account for even the small durations of usage, approaches such as Patel's may require very high sampling rates in (e.g., at a frequency of 1000 times per second or 1 KHz) to not overlook the events of short duration. As can be recognized, such high sampling rates come with high processing power consumption, which lends such approaches poorly to the use of mobile or handheld battery powered devices for monitoring the usage and potential deviations from established signatures for the fixtures.

Accordingly, there is a need in the art for reliable and effective water leakage detection techniques which avoid the aforementioned drawbacks of conventional approaches.

SUMMARY

Exemplary aspects of the invention are directed to systems and method for monitoring liquid (e.g., water) pressure to detect liquid leaks based on a global sequence alignment technique. An exemplary monitoring device in a liquid distribution obtains periodic samples at regular time intervals from a representative node of a liquid distribution system. Sequences of the samples are formed for a current time instance and for historical data comprising samples at the same node related to the same time instance, such as samples which are a day old and/or a week old. Global sequence alignment algorithms are implemented at a cloud computing service to determine if there are deviations from liquid pressure patterns at the node which are indicative of a liquid leak. Related notifications are provided wirelessly to user devices.

For example, an exemplary aspect is directed to a method of detecting liquid leaks in a liquid distribution system. The method comprises obtaining periodic samples at regular time intervals from at least a first node of a liquid distribution system and forming a first sequence of the samples for a first time period corresponding to a first time instance. The first sequence of the samples is compared with at least a second sequence of samples previously obtained at the first node for the first time period at a second time instance matching the first time instance and it is determined whether there is a leak based at least in part on the comparison.

Another exemplary aspect is directed to a apparatus configured to detect liquid leaks in a liquid distribution system. The apparatus comprises means for obtaining periodic samples at regular time intervals from at least a first node of a liquid distribution system, means for forming a first sequence of the samples for a first time period corresponding to a first time instance, means for comparing the first sequence of the samples with at least a second sequence of samples previously obtained at the first node for the first time period at second time instance matching the first time instance, and means for determining whether there is a leak based at least in part on the comparison.

Yet another exemplary aspect is directed to a non-transitory computer readable storage medium comprising code, which, when executed by a processor, causes the processor to perform operations for detecting liquid leaks in a liquid distribution system, the non-transitory computer readable storage medium comprising: code for obtaining periodic samples at regular time intervals from at least a first node of a liquid distribution system, code for forming a first sequence of the samples for a first time period corresponding to a first time instance, code for comparing the first sequence of the samples with at least a second sequence of samples previously obtained at the first node for the first time period at a second time instance matching the first time instance, and code for determining whether there is a leak based at least in part on the comparison.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Aspects of the invention are disclosed in the following description and related drawings directed to specific aspects of the invention. Alternative aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In exemplary aspects of this disclosure, liquid leak detection, and more specifically, water leak detection is based on correlation of water pressure samples with corresponding historical data. For example, it is recognized that in a residential setting, the structure of each house and layout of water pipelines thereof may be different; and furthermore, the occupants of each household may have different schedules and usage patterns. However, usage patterns may have a high level of repeatability within the same household. Thus, rather than rely on the fixture classification models previously discussed, exemplary systems are configured to sample liquid pressure, specifically, water pressure data at least one node of a water distribution system and compare the water pressure data of the node with prior samples collected for the node. For example, the prior samples compared against the current samples may be one day old, one week old, or a combination thereof, but for substantially the same time points, which accounts for the high repeatability of usage patterns observed within such settings.

Aspects of this disclosure include at least one exemplary monitoring device deployed at the at least one representative node of a water distribution system within a household, for example (although it will be understood that a household is merely used as an illustrative example in this disclosure, and as such, exemplary aspects may be equally applicable to any water or liquid distribution system in any setting including residential and commercial settings, without limitation). The water distribution system may be behind (or controlled by) a water pressure regulator (e.g., at a main supply line to the household), and as such, the water distribution system may be a closed loop. The monitoring device can be installed inline within a pipeline of the water distribution system, e.g., at any point inside the closed loop, or may be affixed (e.g., screwed on) to an existing fixture such as a spigot or faucet, for ease of installation. Although in this disclosure, only one monitoring device is described for each water distribution system (e.g., each household), it will be understood that this is not meant to be a limitation, and as such, a combination of more than one monitoring device may also be used, e.g., installed at more than one representative nodes, based on specific needs which may arise for different water distribution systems, without departing from the scope of this disclosure.

Accordingly, the exemplary monitoring device installed at a particular node of a liquid distribution system, such as a water distribution system, may obtain samples at regular time intervals. The time intervals for samples may be of a much larger granularity (e.g., once every 15 seconds) than the known approaches discussed above which require low granularities or high sampling frequencies (e.g., of the order of 1 KHz) because the exemplary monitoring device need not monitor specific opening/closing events associated with particular fixtures, but are rather deployed to continuously sample liquid pressure at the same node to correlate with corresponding history of liquid pressures of the node.

The exemplary monitoring device may be battery powered or plugged in to an outlet, without limitations, and may be connected in a wired or wireless manner to a central controller. In one implementation, the monitoring device may be Internet-of-Things (IoT) capable and connected over the air or wirelessly (e.g., via a home WiFi or other wireless Internet Protocol) via an network such as the Internet (interconnected computers and computer networks that uses a standard Internet protocol suite (e.g., the Transmission Control Protocol (TCP) and IP)) to transmit the sampled liquid pressures at their respective nodes to a cloud computing service. Storing the samples reported from the monitoring device, and executing the algorithms and processes for correlating the samples with historical data may be performed remotely in the cloud computing service and the results (e.g., if a liquid leak or water leak is detected) may be reported to one or more user devices such as handheld mobile phones, laptops, etc. Exemplary algorithms for the above processes will be explained in the following sections. However, it will be understood that aspects of remote processing in a cloud computing service are also exemplary, and the monitoring devices may themselves store the samples and perform related computations locally to provide alerts or information to a user in any other manner through any other medium, without limitation.

Figure 1A:
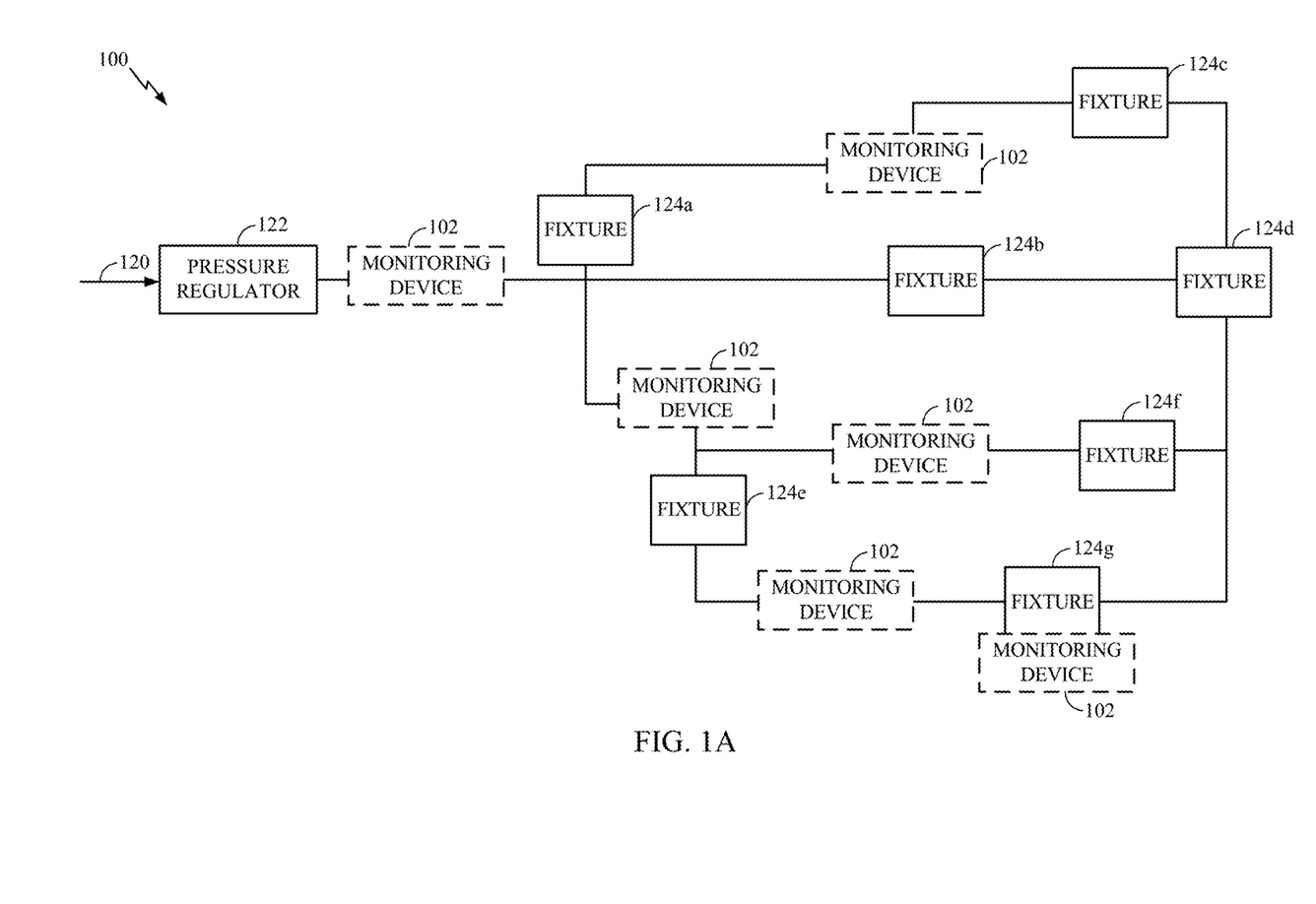
FIGS. 1A-B illustrate an exemplary water distribution system and deployment of water pressure monitoring features according to aspects of this disclosure.

With reference first to FIG. 1A, a schematic view of liquid distribution system, and more specifically an exemplary water distribution system 100 is illustrated. System 100, in one example, may represent a water distribution system for a household, and the various components, arrangements, and configurations thereof are merely for the sake of explanation, and not to be construed as a limitation. Incoming water supply may be through line 120, which first enters pressure regulator 122, which may prevent very high water pressures (for example, such high water pressures may occur due to fluctuations in the neighborhood of system 100, water pressure spikes caused by a water tank pump which may be turned on when water pressure falls below a specified threshold in a water tank supplying water to the household, etc.) from entering into system 100. System 100 is a closed loop, and the water pressure within system 100 is maintained by pressure regulator 122.

Various fixtures 124a-g are illustrated within system 100, which may include indoor fixtures such as faucets, showers, sinks, washing machines, dish washers, toilets, etc., as well as outdoor fixtures such as water sprinklers. An example monitoring device designated by the reference numeral 102 is shown in dashed lines at various points of system 100 to convey possible placement of monitoring device 102 within system 100. As previously mentioned, although options with more than one such monitoring device within each system 100 are not excluded from this disclosure, in the following discussion, one monitoring device 102 placed at one of the locations shown in system 100 will be considered as being disposed in a representative node of system 100.

The representative node where monitoring devices 102 is instantiated may be specific to each system and need not be limited to any relative or absolute placements within the system. The representative node for monitoring may be chosen based on the layout of the various fixtures 124a-g within system 100, for example; potential water leaks within system 100 may be detected based on the water pressures sampled at the representative node, for example, as discussed in the following sections. As seen, several possible instantiations of monitoring device 102 may be inline (representatively, water pipelines) within system 100, while in some cases, e.g., as shown for fixture 124g, monitoring device may be affixed (e.g., screwed on, coupled to, or directly connected to) the fixture, which may simplify installation in cases where fixture 124g is a spigot or faucet to which monitoring device 102 may be screwed on, as one possible option. In exemplary, monitoring device 102 may generally comprise a processor or means for performing the following functionality.

Monitoring device 102 periodically samples liquid pressure, specifically, for example, water pressure at its respective node, wherein the water pressure can change at the node based on opening/closing events at one or more of fixtures 124a-g, and patterns of the water pressure as observed through the samples at the node are expected to have no or small deviations (e.g., within an hour of observation), in the event of no water leaks. Deviations from the expected patterns for prolonged periods of time (e.g., over several hours) may indicate water leaks. For example, if, based on exemplary analysis of samples collected over a period of time (e.g., a few hours) there is an indication of continued or continuous loss in water pressure, this could imply that there has been a large amount of water loss.

Figure 1B:
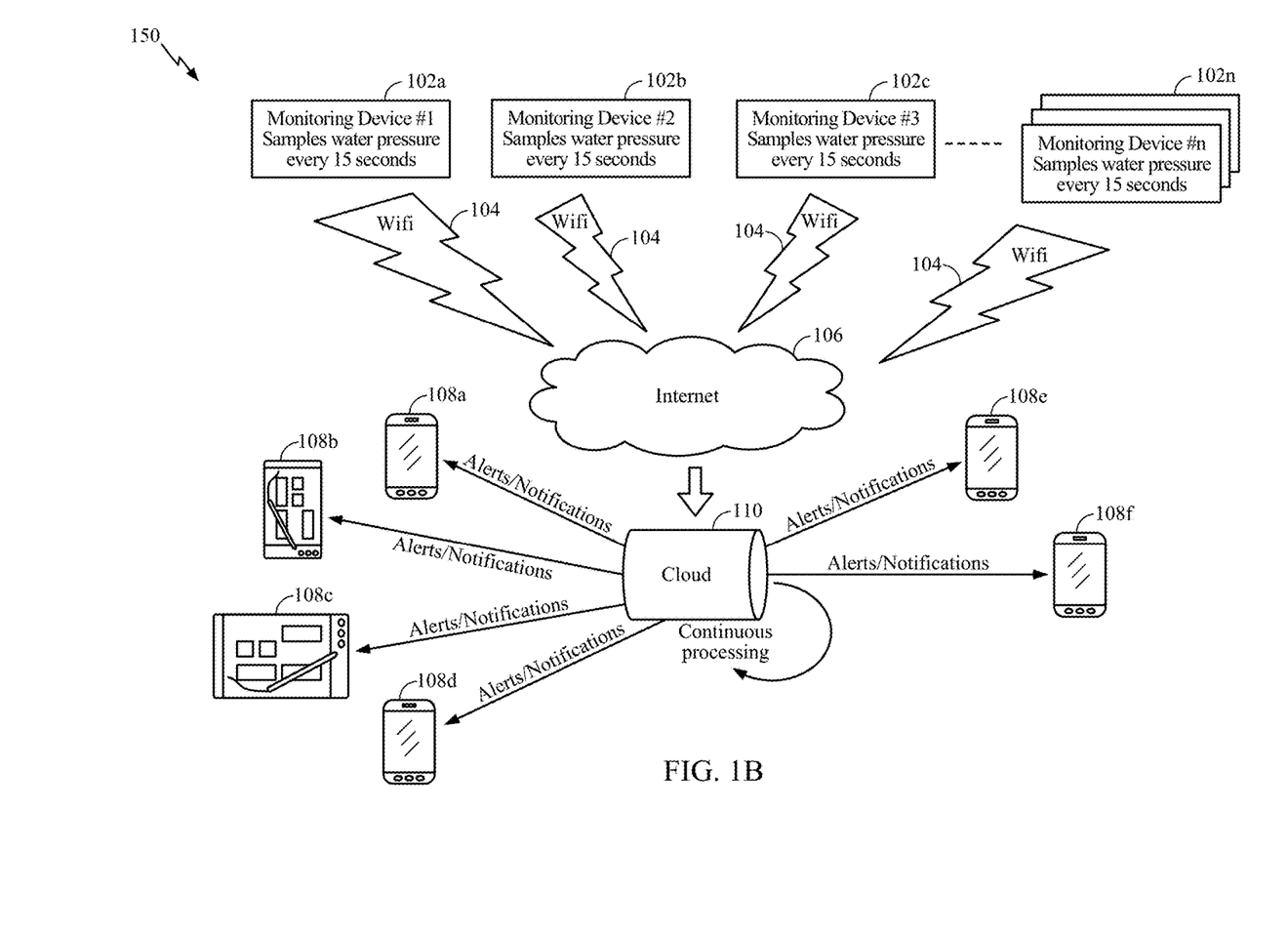

Referring now to FIG. 1B, system 150 is shown, which comprises monitoring devices 102a-n of various liquid distribution systems such as water distribution system 100 of FIG. 1A (e.g., various households in a neighborhood). Each one of monitoring devices 102a-n may represent a monitoring device such as monitoring device 102 of FIG. 1A, disposed at a respective representative node of the various systems encompassed in system 150. At their respective nodes across the various systems, monitoring devices 102a-n may each sample water pressure at a regular interval, which may be the same or different across the various monitoring devices 102a-n. For the sake of simplicity of explanation, each one of monitoring devices 102a-n may be configured to sample water pressure at the same interval, e.g., once every 15 seconds (or more generally, a first interval), which can also be referred to as the granularity of the samples.

Monitoring devices 102a-n, in one implementation, send out the samples over a wireless medium shown as WiFi 104 in the example of FIG. 1B, although any other wireless or wired medium can be possible in other implementations. In some aspects, monitoring devices 102a-n may also be configured with sufficient storage capacity to store a few samples before they are sent out, e.g., in the event there is a loss of wireless connectivity. Monitoring devices 102a-n may comprise a processor or microcontroller platform (e.g., Arduino) augmented with software, hardware, firmware, or combinations thereof, configured to sample water pressure, e.g., at the first time interval of 15 seconds when connected to the respective nodes.

Generically, internet 106 is depicted as a medium which receives the samples from monitoring devices 102a-n over WiFi 104, where, for example, internet 106 may represent a gateway, a super-agent, a router, or a hub, as understood in the art of IoT.

From internet 106, the samples may be passed on to cloud 110, which representatively illustrates a cloud computing service (e.g., Linux Ubuntu servers with a modified version of Thingspeak IoT package). Cloud 110 may generally include any processing system or means for performing the following functionality. In an exemplary aspect, cloud 110 stores the samples from the various monitoring devices 102a-n (e.g., over one or more weeks' worth of samples from each one of monitoring devices 102a-n) and executes the algorithms for correlating samples with historical data (explained in detail in later sections). The above processing in cloud 110 is performed continuously. While various settings are possible for generating notifications and alerts, in one implementation, abnormal activity which may be indicative of alerts, when and if detected by cloud 110 can be sent to various corresponding user devices, e.g., mobile phones, laptop computers, tablets, etc., representatively shown as user devices 108a-f (an example user interface will also be explained in the following sections for applications on user devices 108a-f associated with exemplary water leak detection techniques). Specific user devices 108a-f may have specific associations with the different monitoring devices 102a-n (e.g., user device 102a may be associated with the household where monitoring device 102a is installed, in one non-limiting example), and those specific associations may be maintained in sending out the notifications (e.g., a notification based on monitoring device 102a may be specifically sent to user device 102a, but not to user devices associated with other monitoring devices, keeping in mind that more than one user device may be associated with each monitoring device).

In an example aspect, a scoring based global sequence alignment algorithm (e.g., based on an exemplary implementation of the well-known Needleman-Wunsch algorithm) may be executed in cloud 110, e.g., in a continuous manner, to analyze a set of current samples in light of corresponding previous samples, e.g., to compare or correlate a current time period such as one hour of samples from a particular monitoring device 102a-n to the same hour of a prior day or a prior week. Since short bursts or fluctuations are possible, a sliding window of overlapping time periods over a particular time slot (e.g., 5 minutes) is used to obtain multiple (e.g., 12 in the case of 1 hour time period and 5 minute time slots) scores, and the aggregate of these scores is considered, in order to smooth out possible fluctuations such as short bursts or spikes. The multiple scores are each also assigned a weight, which indicates their relative significance, wherein the weight represents the proportion or percentage of samples relative to the expected number of samples which are actually present for the time periods (e.g., some samples may be missing due to various reasons, e.g., loss of connectivity, power outage, etc.). In an example implementation, a weight value can range between 0 and 1 (e.g., as will be further described with reference to FIG. 2C), wherein scores with more missing samples, for example, are weighted lower. The weighted scores are then aggregated, such that if there is a perfect match between one time period and its counterpart prior time period, then the weighted aggregate of the scores would be 12, while if there is no match, the weighted aggregate would be 0. However, in practical scenarios, a perfect match which would generate a weighted score of 12 is unlikely, because even though there are likely to be repetitions in water usage patterns within a household on a day-to-day basis, it is unlikely that there will be an exact replica in water usage patterns between two days. This means that the weighted aggregate is likely to lie somewhere in between 0 and 12, even if there is no leak. Thus, to differentiate a water leak from normal water usage patterns, some threshold values may be specified such that a weighted aggregate above the threshold indicates that there is no leak, but a weighted aggregate below the threshold indicates a leak.

In some aspects, more than one prior time period may be considered, e.g., a counterpart one hour of a prior day as well as a counterpart one hour for one or more prior weeks to improve the overall weighted aggregates. This process will be explained in further detail, following a brief exposition of the global sequence alignment (e.g., an exemplary implementation of the Needleman-Wunsch algorithm) as applied in exemplary aspects.

Figure 2A:
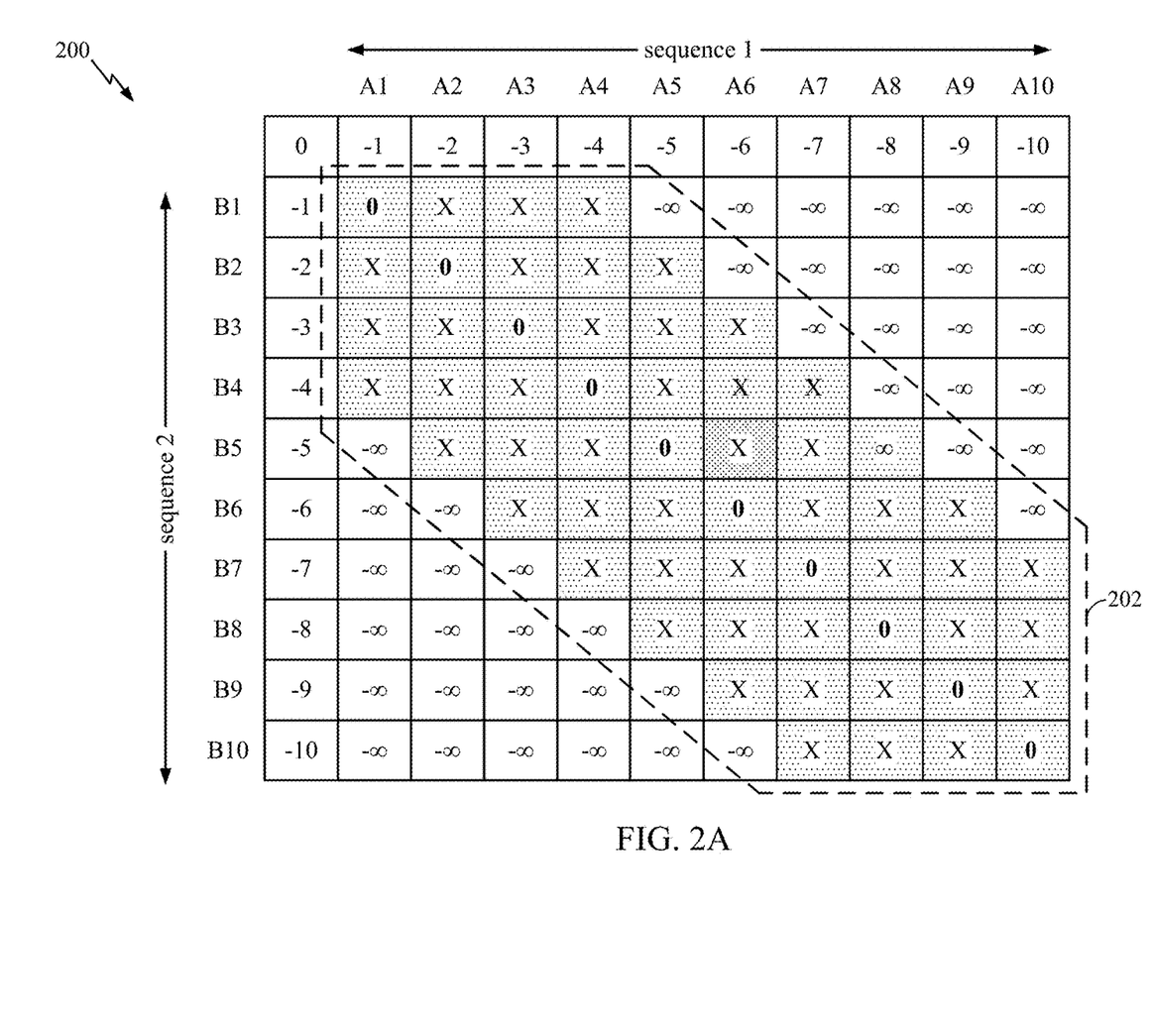
FIGS. 2A-C represent an implementation of exemplary algorithms for comparing sequences, according to aspects of this disclosure.
Figure 2B:
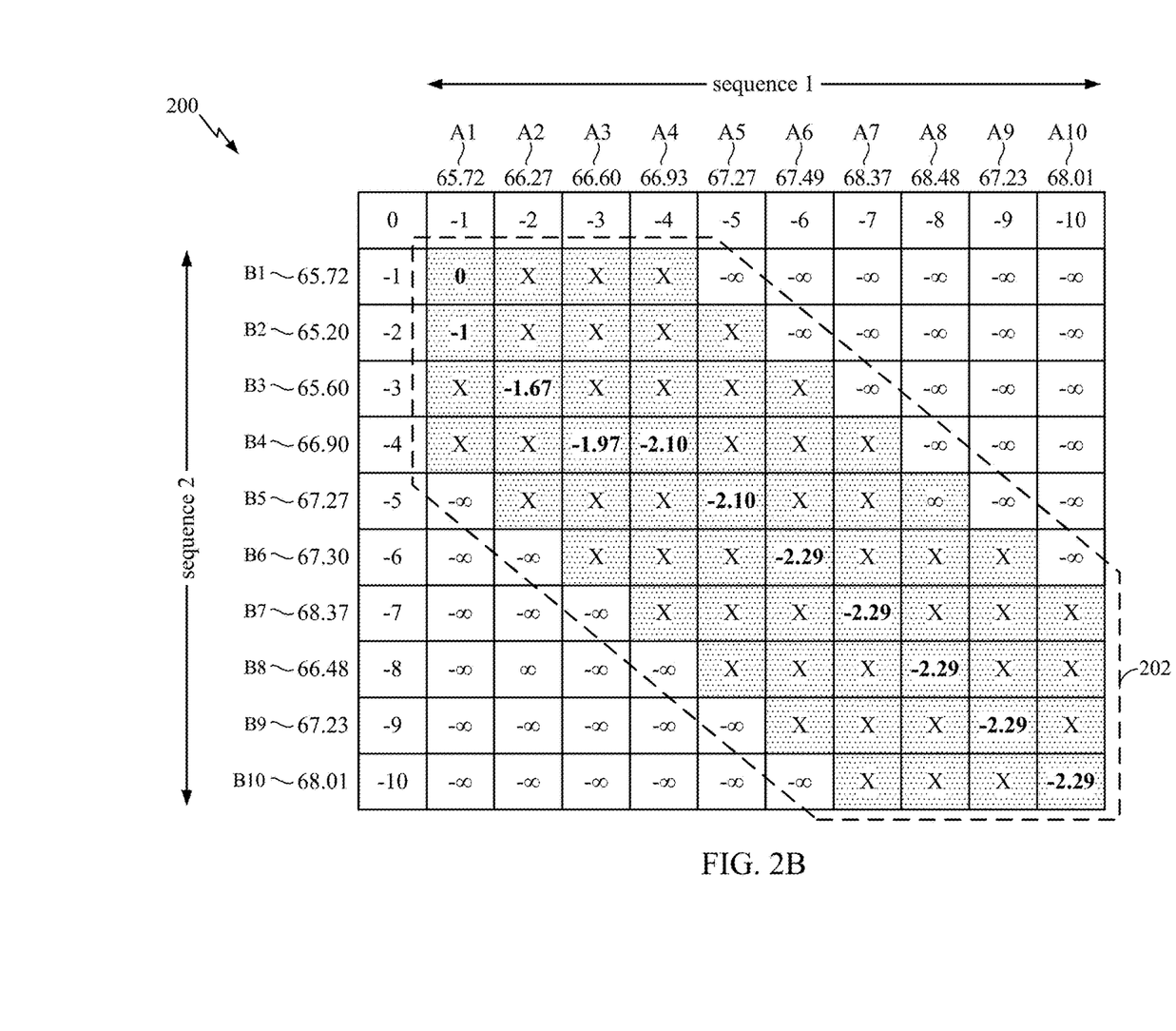

With reference to FIG. 2A-B, aspects of the Needleman-Wunsch algorithm will be explained with reference to matrix 200. The Needleman-Wunsch algorithm is a nonlinear global optimization method that was originally developed for amino acid sequence alignment in proteins. The algorithm is an iterative method in which all possible pairs of amino acids (one from each string) are set up in a 2D matrix and alignments are represented as pathways through this array. The optimum alignment is the path (or paths) connecting maximum scoring values. In exemplary aspects, sequences of pressure samples at various time instances are considered, rather than the sequence alignment for amino acids discussed in the original Needleman-Wunsch algorithm. It will be understood that although the Needleman-Wunsch algorithm is described in the specific examples below, any other global sequence alignment technique may be used without deviating from the scope of this disclosure.

For example, considering a time period such as one hour or 60 minutes of samples from one of monitoring devices 102a-n (looking backwards from a current time instance, e.g., "t1" on a clock, for example), there will be 60 minutes times 4 samples (with a sampling interval of 15 seconds) =240 samples. When sorted in an ascending time order (or descending order, without loss of generality), the 240 samples represent a first sequence for the current time instance t1. A counterpart time period of 60 minutes comprising 240 samples for the same monitoring device 102a-n, e.g., which was stored in cloud 110 is retrieved for the same time instance t1 but of a different day, e.g., a prior day or a prior week to provide a second sequence. An exemplary aspect is directed to determining how the first sequence aligns with the second sequence, with the notion that alignment (greater than a threshold measure) represents normalcy or no leaks, whereas misalignment (alignment being less than a threshold measure) represents potential deviations from the expected pattern which may be due to a leak. Aspects of using a sliding window to smooth out fluctuations will be discussed with relation to FIG. 2C in later sections.

With reference to FIG. 2A, the topmost horizontal row of the two-dimensional matrix 200 comprises a first sequence (sequence 1) denoted by the terms A1-A10, which are illustrative of a portion of 10 ordered samples (out of the 240 samples) of the first sequence. For example, A1-A10 represent liquid pressure samples (e.g., in pounds per square inch (PSI), with FIG. 2B providing numerical examples of these pressure samples) for a respective node, with consecutive samples ideally separated by the sampling interval of 15 seconds (although gaps in the samples or deviations from the ideal separation are possible within the sequences, normalization techniques as discussed further below may be applied to have the same number of samples between the two sequences to be compared using the exemplary global sequence alignment technique, e.g., based on the Needleman-Wunsch algorithm). Similarly, the leftmost vertical row of matrix 200 comprises 10 ordered samples B1-B10 of the second sequence (sequence 2), normalized or adjusted to the same time scale as A1-A10. Cells inside matrix 200, are identified by the position of their row-column intersection as C(i,j) for i=0-10 representing row numbers and j=0-10 representing column numbers in the illustration shown. For example, C(0,0) is at the top-left corner and C(10,10) is at the bottom-right corner at the intersection of A10 and B10. The process of alignment using the Needleman-Wunsch algorithm will be explained for this representative 10×10 matrix, which will be extended to the entire 240×240 matrix for each one hour of samples which are determined for correlation or alignment with a counterpart one hour samples. In this regard, FIG. 2A represents a case where there is a perfect match between the values of A1-10 and corresponding values of B1-10, while FIG. 2B illustrates example numerical values (e.g., as may be representative of a practical scenario) of A1-10 and B1-10, with several mismatches between respective samples.

An example implementation of the Needleman-Wunsch algorithm for determining alignment between A1-10 and B1-10 may begin with an initialization process wherein a value of 0 is assigned to the top-left corner cell C(0,0). The remaining cells of row 0, i.e., cells C(0, j) for j=1-10 are initialized to values obtained by subtracting a gap penalty "g" from the value of a cell to the left of a given cell. In general, the gap penalty is assigned a value which is the negative of the gap in this disclosure (e.g., if the gap is −1, the gap penalty is 1). Thus, where the gap penalty g=1, the values of cells C(0, j) for j=1-10 are shown as −1, −2, . . . −10. Similarly, the remaining cells of column 0, i.e., cells C(i, 0) for i=1-10 are initialized to values obtained by subtracting a gap penalty g=1 from the value of a cell to the top of a given cell. For example, the values of cells C (i, 0) for i=1-10 are shown as −1, −2, . . . −10. All remaining cells, i.e., cells C(i, j), i=1-10 and j=1-10 are initialized to a value of negative infinity (−∞).

The next step comprises moving through cells C(i, j), i=1-10 and j=1-10 (which were initialized to negative infinity, −∞) and populating their match scores, by starting at cell C(1,1) of row 1, proceeding to each cell of row 1, and on similarly to each one of rows 2-10, in the following manner. The score of each of these cells is calculated as the best possible score (i.e. highest value) among the scores of cells to the left, top, or the top-left diagonal, represented by the pseudo-code notation: score(i,j)=max{C(i−1,j)−g, C(i,j−1)−g, C(i−1,j−1)−abs(sequence 1(*i*−1)−sequence 2(*j*−1))}, for i=1-10 and j=1-10 (which steps through i and j values which cover the samples of each one of the first sequence (sequence 1) and second sequence (sequence 2)). In exemplary aspects, the alignment may be constrained by a band referred to as Sakoe-Chiba band, designated as band 202 in FIGS. 2A-B, and will be further discussed in the following sections. Thus, the scores, as above, are calculated only for cells within band 202. The score in the bottom-right corner cell C(10,10) is the final alignment score, denoted as "S" which represents the best overall alignment score of the two sequences.

In a conventional implementation of the Needlman-Wunsch algorithm, an additional, final step is involved, which is referred to as a "trace-back" process. The trace-back process is a process of determining the best alignment between the two sequences based on the scores. Thus, if a better alignment between the two sequences is possible by shifting some cells, filling gaps, etc., this would be provided by the result of the trace-back process.

However, in the exemplary implementation of the global sequence alignment technique based on the Needlman-Wunsch algorithm according to this disclosure, the trace-back process is not required. Rather, by specifying a penalty value "g" and a band constraint (e.g., the cells to be covered within band 202), the comparison of the two sequences is restrained to a tighter path along the diagonal (i.e., around cells C(i,j) where i=j). This is because in the exemplary implementation, there is an interest in comparing the water pressure at a particular time of a day with the water pressure at the same time on a different day, without allowing much deviation from that specific time, which is achieved by restricting the alignment window to band 202 in the example shown. Thus, the final alignment score S is sufficient in the exemplary implementation, without requiring the trace-back process. With the same number of samples in both sequences (with gaps accounted for), the final score is a total score S (which may be either zero or a negative number, and hence, the absolute value is calculated to obtain a positive value). The total score S for matrix 200 is then divided by the number of samples of either sequence 1 or sequence 2 (i.e., 10, as illustrated, and 240 samples for the entire one hour).

Accordingly, as mentioned above, by applying the penalty value "g" as well as the band constraint 202, the exemplary implementation seeks alignment along a path closest to the diagonal. For example, applying a band constraint of a precision of a certain number of time intervals, e.g., of a one minute precision made up of four 15 second intervals, conveys that each sample of one sequence may seek to find alignment by matching a sample of the other sequence within a one minute precision, i.e., there are at most four options for each cell in determining the similarity scores. This is representatively shown as the shaded portions of matrix 200 within band 202 to convey the band that the alignment analysis will be constrained to. Using the gap penalty and/or band constraint can increase pressure on the exemplary algorithm to take a more diagonal path with reduced or no options for shifting (insertion and/or deletion), while allowing the algorithm to account for minor variations in patterns (e.g., minor deviations in the schedule or water usage of occupants in a household being monitored), e.g., by considering adjacent time interval samples within the band. In one aspect, varying the gap penalty and width of the band constraint may be similar to the Sakoe-Chiba band used in Dynamic Time Warping using the Needleman-Wunsch algorithm, as discussed in Ratanamahatana et al. "Everything you know about Dynamic Time Warping is Wrong," Section 2.2, Lower Bounding the DTW Distance, Third Workshop on Mining Temporal and Sequential Data, August, 2004, Seattle, Wash., available at http://wearables.cc.gatech.edu/paper_of_week/DTW_myths.pdf).

Effectively, the final score is largely influenced by the result of the absolute difference of pairwise cells in each sequence (e.g., abs (sequence1(*i*−1)−sequence2(*j*−1)) where i ranges through all samples of each one of the first sequence (sequence1) and j ranges through all samples of each one of the second sequence (sequence2) inside the boundary defined by the band constraint 202. The closer the final score is to zero, the better the match between the two sequences.

In FIG. 2A, where there is assumed to be a perfect alignment of the two sequences, i.e., the values of A1-10 match corresponding values of B1-10, the diagonal from the top-left to the bottom-right of matrix 200 (i.e., comprising cells C(i,j), i=j) will comprise all 0s in the exemplary implementation of the Needleman-Wunsch algorithm, which will lead to an overall score of zero at the bottom-right corner cell C(10,10). Although not all other cell values of matrix 200 have been explicitly shown, these remaining values will be negative.

In FIG. 2B, example numerical values have been shown for sequence 1 comprising A1-10 and sequence 2 comprising B1-10. Several pairwise mismatches can be observed, e.g., between A2 and B2; A3 and B3; A4 and B4; etc. As a result, the scores computed for cells in the diagonal path are not all zeros, and the final score is shown as a negative value of −2.29. Once again the values in the remaining cells are also negative. The cells for which numerical values have been shown, generally within band 202 and specifically along the diagonal, represent the best alignment between sequences 1 and 2 in this illustration.

As previously mentioned, it is possible for some samples in either one or both of the first or sequence sequences to be missing (e.g., firmware sampling latency, time drift in clocking mechanisms on monitoring devices 102*a-n*, breaks in Internet connection, etc. can lead to samples sent by monitoring devices 102a-n which may not perfectly align with the expected time intervals of 15 seconds in the above example). In order to avoid spurious results or incorrect matching scores in the above implementation of the Needleman-Wunsch algorithm, samples of each time period (e.g., 60 minutes) are inspected by walking through each sample and its associated timestamp, and the samples are aligned (also referred to as "normalization") with counterpart historical data, e.g., a previous day's as well as a previous week's sequence of samples for the same time period (e.g., relative to the same time instance t1). Thus, three sequences may be obtained for each time instance t1, a first sequence comprising samples in the last one hour (current) data (or more generally, a first time period corresponding to the first time instance t1), a second sequence of historical data comprising samples in the same one hour relative to time instance t1 of the previous day (or more generally, for the first time period at a second time instance matching the first time instance), and a third sequence of historical data comprising samples in the same one hour relative to time instance t1, one week ago (or more generally, for the first time period at third time instance matching the first time instance).

For each one of the first, second, and third sequences, completeness of the sample set thereof is determined based on counting the number of samples (e.g., by walking through 15 second intervals and incrementing a counter each time a sample is found at its expected 15 second interval). If a sample is not found at an expected interval, the interval time may be increased (e.g., a +/−30 second window may be checked) and if a sample is found in one sequence with the increased/decreased interval time, the time stamps for the corresponding samples in the other two sequences are also adjusted to align with the corresponding timestamp. If a sample is not found even within the increased/decreased interval, a missing sample may be declared and a zero pressure value may be inserted. At the end of the alignment or normalization, all three sequences are expected to have the same number of samples with their sample timestamp aligned with each other. Further, percentages are calculated indicating how many data points or samples are present in each sequence.

An adjustable threshold value to represent a minimum percentage value may be used to determine whether the calculated minimum percentages for each sequence are sufficient or insufficient for obtaining a meaningful result. For example, in one implementation, if the minimum percentage threshold may be set at 60%, then if any sequence has less than 60% of the samples (e.g., less than 144 of the expected 240 samples in an hour), then that sequence may be considered as missing; otherwise it is considered to be complete. Thus, a missing or complete determination is obtained for each one of the first, second, and third samples, at each time instance.

In addition to whether a sequence is missing or complete, yet another parameter relates to the notion of validity of the sequence. In exemplary aspects, if a past sequence has a very low aggregated weight value (which may be an indication of a suspected water leak), then that sequence may be deemed as invalid. Cloud 110, in one implementation, may preserve aggregated weights of prior sequences during particular time instances, and the related samples would thus be considered invalid.

In an example implementation, regardless of whether a sequence is determined to be missing/complete or valid/invalid, a determination of match or mismatch with a prior counterpart sequence is also determined. For example, a first score of match/mismatch is obtained by comparing the first (current) sequence (e.g., first sequence comprises samples A1, A2, . . . in FIGS. 2A-B) with the second (day old) sequence (e.g., second sequence comprises samples B1, B2, . . . in FIGS. 2A-B). A second score of match/mismatch is obtained by comparing the first (current) sequence (e.g., first sequence comprises samples A1, A2, . . . in FIGS. 2A-B) with the third (week old) sequence (e.g., third sequence comprises samples B1, B2, . . . in FIGS. 2A-B). In one aspect, match/mismatch determinations based on the scores are determined using an adjustable threshold, e.g., set at 0.3, wherein, if the alignment score for either of the two comparisons (e.g., the first sequence and the second sequence or the first sequence and the third sequence) is greater than 0.3, the respective comparison is determined to indicate a mismatch of the two sequences; otherwise it indicates a match.

Figure 2C:
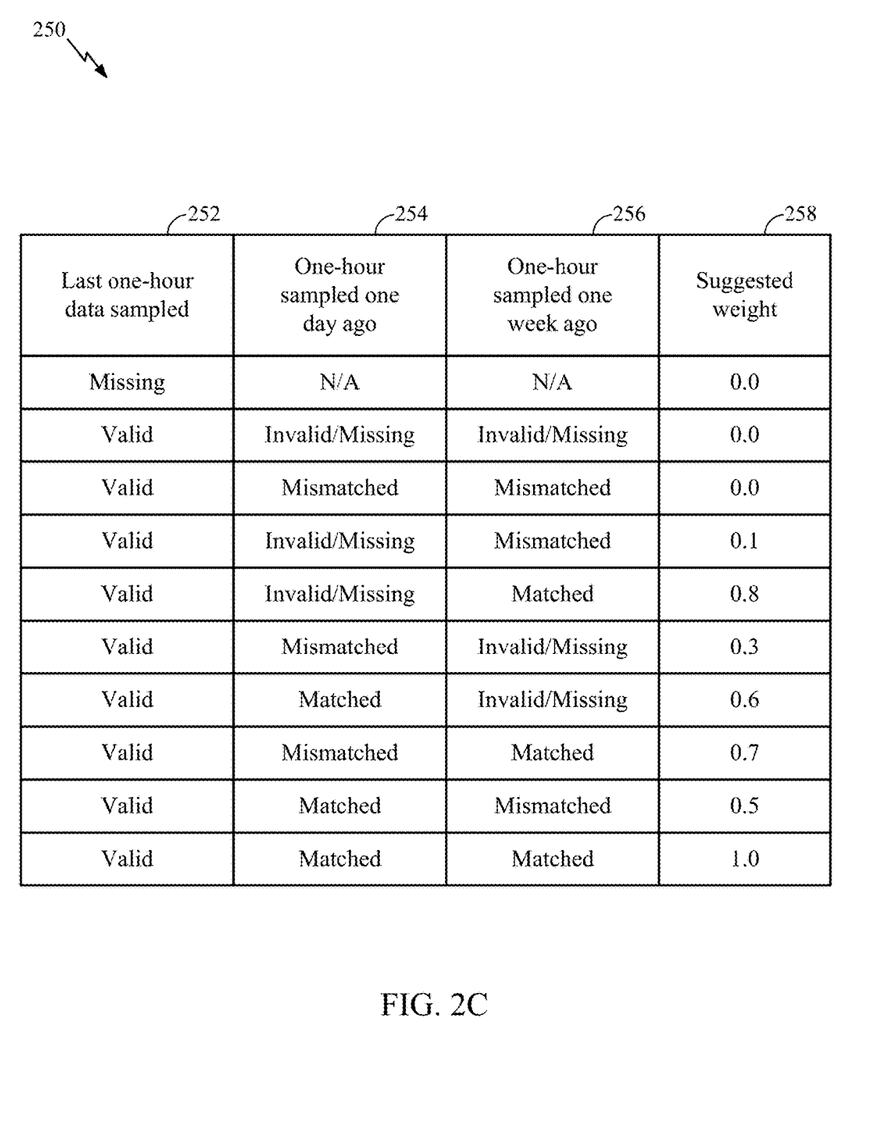

With reference now to FIG. 2C, using at least the determinations of missing/complete, valid/invalid determinations for each one of the first, second, third sequences, as well as the first and second match/mismatch results, weights are generated in the following manner. For example, FIG. 2C shows a table 250 with four columns, 252, 254, and 256 corresponding to the first, second, and third sequences, respectively, and a fourth column 258 representing an overall weight. Each row of table 250 shows related information. For the first sequence, column 252, the rows represent whether the last one hour comprises missing data and if not, if the data is valid. For the second column 254, the rows show whether data is missing or invalid (i.e., there is a very low aggregated weight) and if not, whether there is a match/mismatch with column 252. Similarly, for the third column 256, the rows show whether data is missing or invalid (i.e., there is a very low aggregated weight) and if not, whether there is a match with column 252.

The weights are generated in such a way to give more weight to the cases where the first sequence matches the prior sequences, and less weight to cases where there are mismatches, invalid/missing samples, etc. in corresponding rows of columns 252, 254, and 256. Thus, the last row where column 252 indicates that the first sequence has valid data which matches with both the second sequence and the third sequence as shown by the last rows of columns 254 and 256 is given the most weight, "1.0" in column 258. The weight assigned is "0" for the first three rows with invalid/missing data and mismatches in both columns. It is observed that in some cases, a day old data sequence for with a weekday (e.g., Monday) will relate to the weekend (Sunday) and similarly, the day old data for a weekend (e.g., Saturday) will relate to a weekday (Friday). Since water usage is likely to be different between weekdays and weekends in typical scenarios, to account for these corner cases, the weights in column 258 may be biased towards higher weights for week old comparisons. Therefore, the case where there is a mismatch between columns 252 and 254 but a match between columns 252 and 256 is provided a weight of 0.7, while the opposite, with a match between columns 252 and 254 but a mismatch between columns 252 and 256 is provided a lower weight of 0.5.

As previously mentioned, there may be occasional and undesirable short bursts or fluctuations in water usage patterns within small windows. To smooth out these short bursts and focus on trends over a longer duration, a sliding window of the same time period as it passes through a particular time slot is considered, which will be explained with reference to FIG. 3A.

Figure 3A:
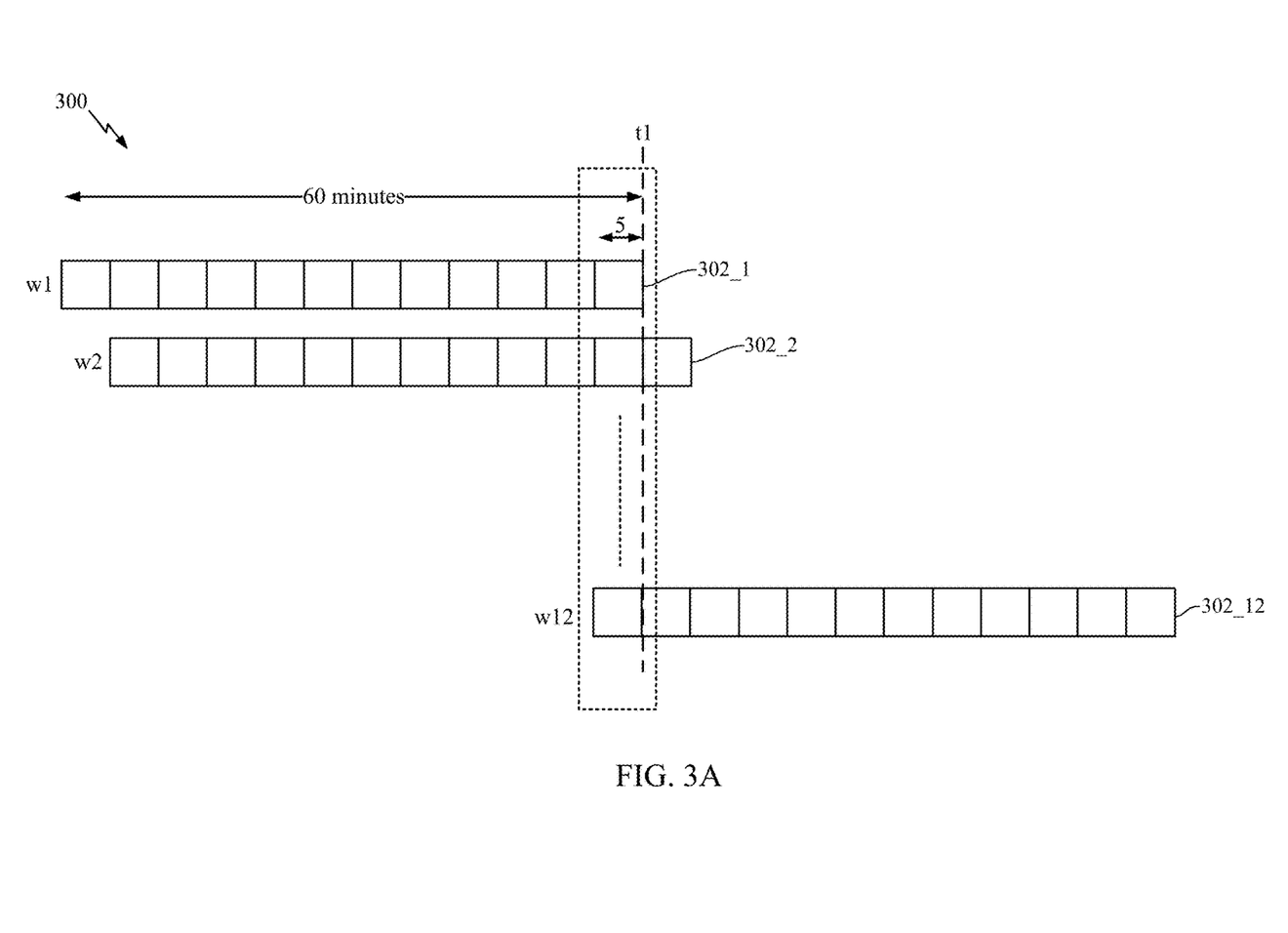
FIGS. 3A-B represent sliding window processes and related weight accumulation features according to aspects of this disclosure.

In FIG. 3A, a collection of time periods 300 is shown. For example, considering a particular time instance t1, the time period which ends in t1 is the last one hour in the previous examples. This time period of 60 minutes is shown as time period 302_1 which can be broken up into 12 time slots of 5 minute durations each. For time period 302_1, a weight value of between 0 and 1, as provided in column 258 of FIG. 2B may have been obtained. However, in some cases, weights may not be generated (or generated as 0) for the various above-described reasons. Thus, in determining whether there was a water leakage in the time slot of 5 minutes which ends in time t1, a sliding window comprising 12 time periods 302_1-302_12 is shown. Each subsequent time period is obtained by moving the previous time period forward by one time slot. Thus, time period 302_2 represents a time period of 60 minutes which ends one time slot or 5 minutes later than time period 302_1. Similarly, time period 302_12 starts with the time slot that time period 302_1 ends in, and time period 302_12 ends 11 time slots (i.e., 55 minutes in this case), later. From the perspective of the 5 minute time slot ending in time t1, this time slot is at the intersection of all 12 time periods 302_1-302_12.

Thus, weight values for each one of the 12 time periods 302_1-302_12 is obtained and shown as w1-w12. Since all 12 weight values may not be present, the actual number of weight values obtained may be lower. The weights w1-w12 are also accumulated and the accumulated weight value is compared with the suggested accumulated weight value (which is a threshold) for the corresponding number weights obtained, as shown in table 350 of FIG. 3B, for example. For example, if 9 weights are obtained for a particular time instance t1 (e.g., among time periods 302_1-302_12) and their accumulated weight of adding w1-w7 is 7.0, from table 350, it is seen that the accumulated weight is lower than the corresponding suggested accumulated weight of 7.47. In this case, it is determined that the weight is not high enough, i.e., when smoothed out, the overall weight indicative of match/mismatch with historical data was lower than the threshold, which may prompt an indication of a water leak being detected. In another example, if 7 weights are obtained for a particular time instance t1 (e.g., among time periods 302_1-302_12) and their accumulated weight of adding w1-w7 is 6.81, from table 350, it is seen that the accumulated weight is higher than the corresponding suggested accumulated weight of 6.10, then it may be determined that there is no water leak and system 100 is functioning normally. In general, it can be appreciated that when a larger number of weights are obtained, a better indication of abnormalities, if any, can be formulated.

Figure 4:
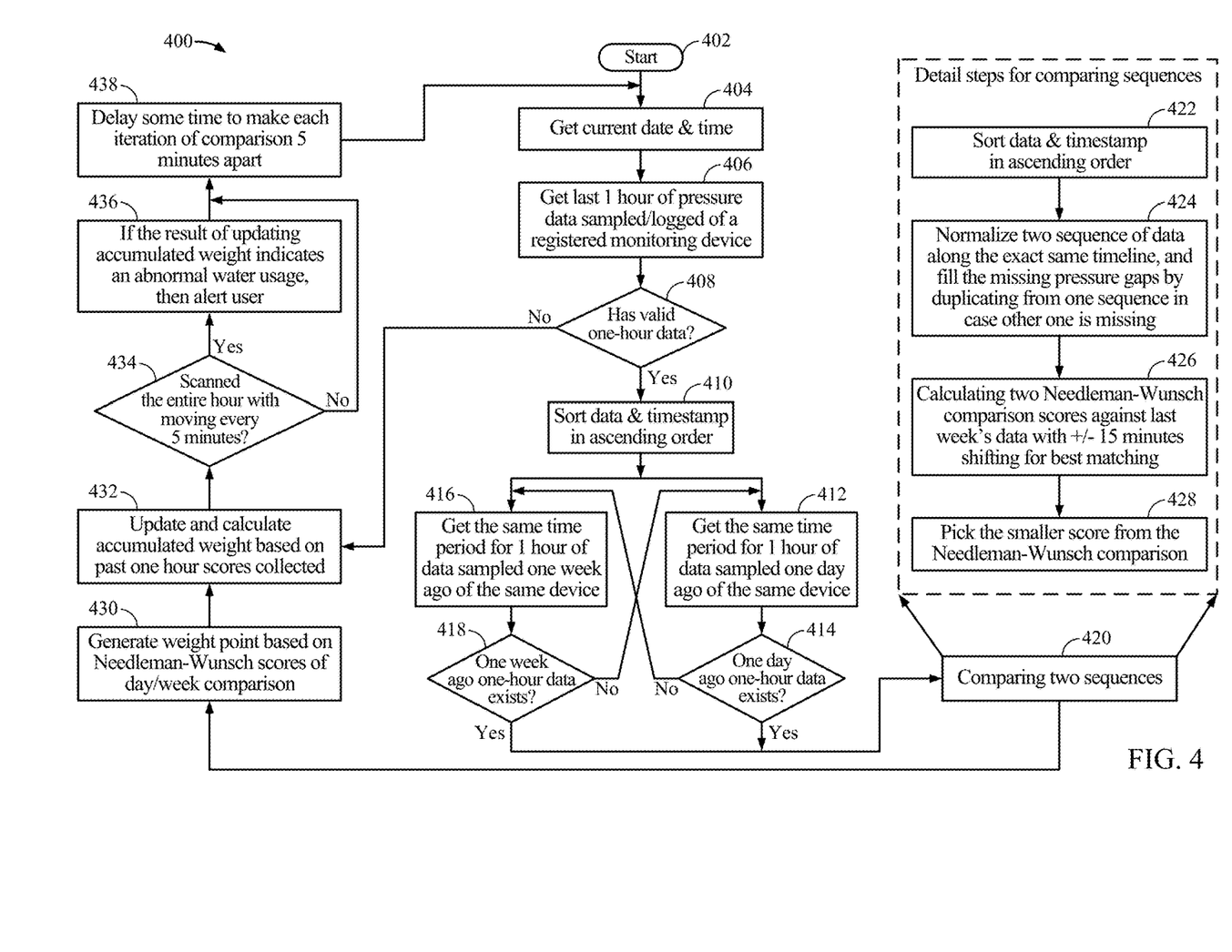
FIG. 4 illustrates a flow chart related to a method of detecting liquid leaks in a liquid distribution system, according to an exemplary aspect.

It will be appreciated that exemplary aspects include various methods and/or means for performing the processes, functions and/or algorithms disclosed herein. For example, FIG. 4 illustrates a flow-chart generally designated as method 400 directed generally directed to monitoring liquid pressure and detecting liquid leaks, and more specifically directed to monitoring water pressure and detecting water leaks according to aspects of this disclosure.

Starting from Block 402 for a particular monitoring device 102a, method 400 proceeds to Block 404 where a current date and time (e.g., t1) is obtained. In Block 406, the last time period, e.g., 60 minutes of water pressure nodes at a corresponding node are obtained and logged or stored (e.g., locally) at the monitoring device (which may be a specific device which was previously registered for monitoring water pressure in system 100 according to aspects of this disclosure). In decision Block 408, it may be determined whether the data logged in Block 406 was valid or invalid. If the data was valid, method 400 proceeds to block 410, where the data is sorted according to time stamps in an ascending order, e.g., to generate the above-mentioned current first sequence of samples.

In Blocks 412 and 416, counterpart historical data related to a day old (second sequence) and a week old (third sequence) one hour time periods are obtained, respectively. As previously explained, if both Blocks 412 and 416 yield complete data then both are used; otherwise, in Blocks 414 and 418 if it is determined if either the second sequence (Block 412) or the third sequence (Block 418) are invalid, then only the other sequence may be used; otherwise both may be used, for example in Block 420.

Block 420 relates to applying the Needleman-Wunsch algorithm, for example, in generating scores as discussed with relation to FIGS. 2A-B. Block 420 is further broken down into Blocks 422, 424, 426, and 428. In Block 422, historical sequences (e.g., a day old and/or a week old) are sorted in ascending time order, in Block 424, the sequences are normalized as previously explained, and in Block 426, the respective Needleman-Wunsch scores are generated. In Block 428, the smaller score from the comparisons is selected (e.g., keeping the above adjustable threshold such as 0.3 in mind, wherein if the score is greater than the threshold, it is a mismatch).

Figure 3B:
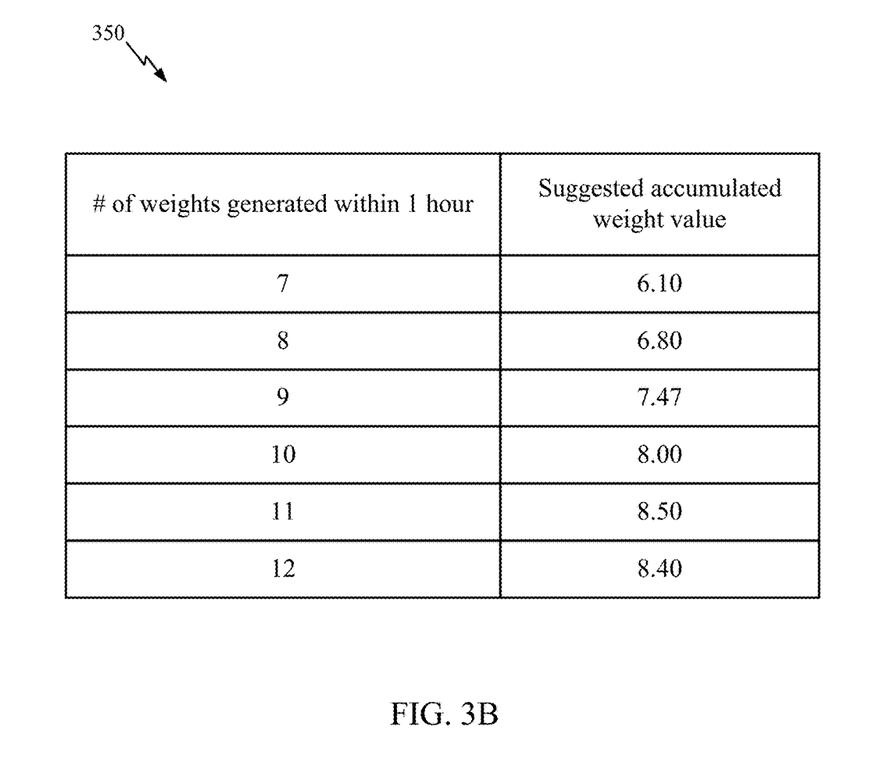

Accordingly, from Block 420, weights are generated for comparison in Block 430. In Block 432, which may either be entered from Block 430, or from decision Block 408 if valid data is not available, accumulated weights using the sliding window of time periods 300 shown in FIG. 3A are calculated and updated. In Block 434, it is determined whether all 12 time slots are cycled through in obtaining and accumulating weights w1-w12. If not all 12 time slots are cycled through for an entire hour, process 400 flows to Block 438. If all 12 time slots are cycled for an entire hour, in Block 436, table 350 is consulted based on the number of weights actually generated and the corresponding suggested accumulated weight threshold. If there is abnormalities or deviations detected based on the comparison of the actual accumulated weight to the suggested accumulated weight, then alerts may be generated accordingly. In Block 438, the next iteration of process 400 is paced and repeated after a delay to create a full sliding window time slot. The amount of delay is determined by the duration of the total time slot minus the amount of time spent in each iteration from Block 406 to Block 436.

Figure 5:
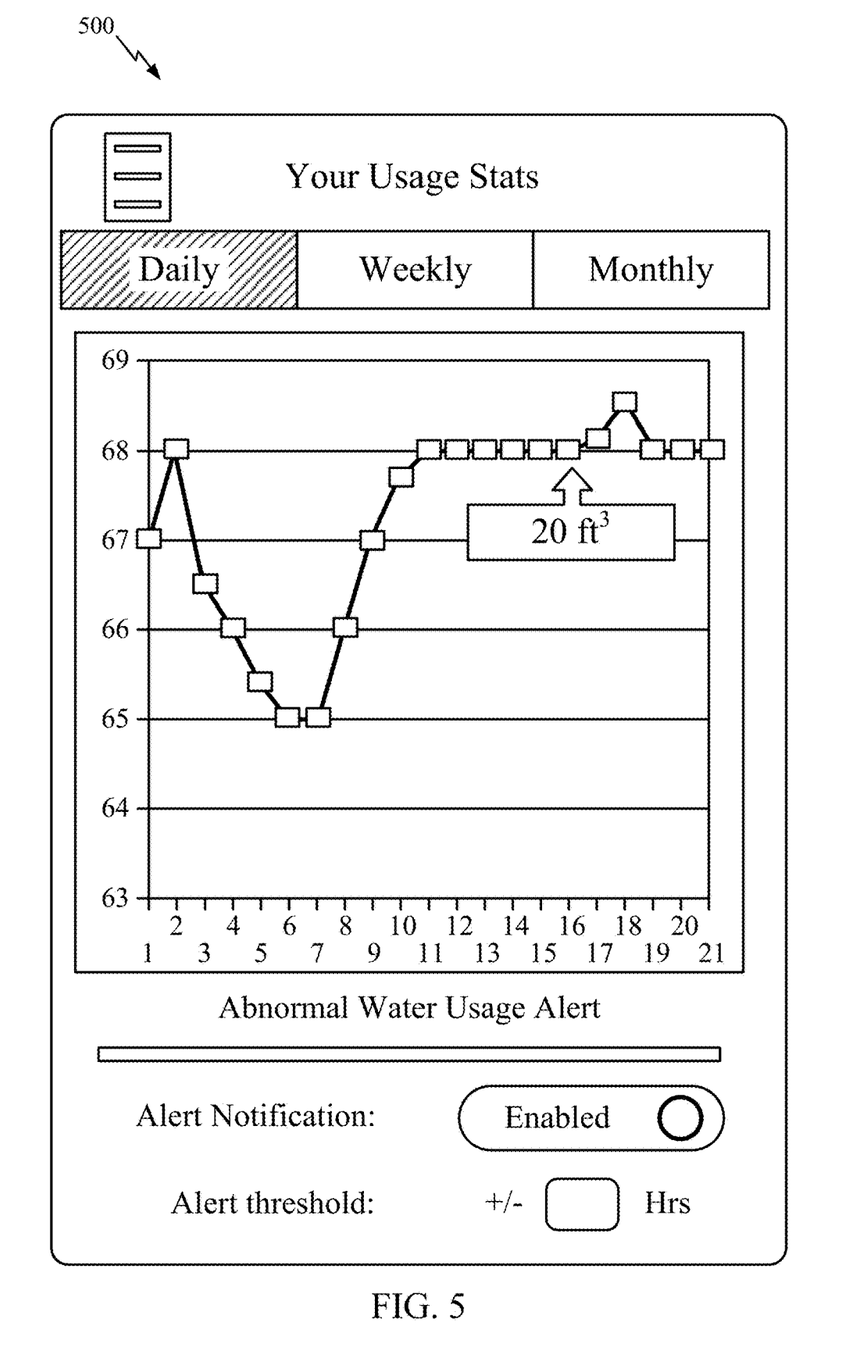
FIG. 5 provides an example user interface for a water pressure monitoring system according to an aspect of this disclosure.

With reference to FIG. 5, an example user interface on user device such as user device 108a-f is shown for receiving alerts and notifications from the above processes of water pressure monitoring and water leak detection. Device 500 may represent any device with a display, for example (e.g., a smartphone). In the event an abnormal water usage pattern is detected as above, cloud 110 may send a notification. The various above-described parameters such as weights and thresholds may be controllable via the interface shown. In some cases, exemplary water detection monitoring may be selectively enabled or disabled for adjustable time periods (e.g., filling a swimming pool or washing a car may trigger an alert as they may not be typically repeated usage patterns, but may consume large quantities of water; but alerts and monitoring may be disabled while such activities or events are in progress and then enabled again).

In some aspects, a training time or calibration period may be involved (e.g., one day or one week) from when monitoring devices 102a-n are deployed in an exemplary water monitoring technique in system 100 to determine the usage patterns of the respective nodes. During this calibration period, pressure samples may be gathered but analyses thereof for abnormalities may be held at bay until sufficient information for establishing usage patterns has been gleaned (it may be assumed that there is no baseline or pre-existing leaks during the calibration period). Accordingly, in exemplary aspects, static or predetermined baseline data is not used but rather real time data which is representative of the specific water distribution system 100 being monitored is gathered. As will be appreciated, by using the real time data in this manner, changes to water usage patterns over time (e.g., due to changing schedules, changing personnel, adding/removing/changing fixtures or settings, etc.) can be accounted for; and by comparing current usage to recent data (e.g., day old, week old, etc.), false alarms may be avoided, unlike in the case of a static baseline where such changes in usage patterns may not be well-represented.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method for water leak detection in a water distribution system. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of detecting liquid leaks in a liquid distribution system, the method comprising:
    obtaining, at a processing device, periodic samples of liquid pressure measured at regular time intervals by a monitoring device, from at least a first node of a liquid distribution system at which the monitoring device is disposed;
    forming, by the processing device, at least:
        a first sequence of the samples for a first time period corresponding to a first time instance;
        a second sequence of the samples previously obtained for the first time period corresponding to a second time instance, the second time instance matching the first time instance; and
        a third sequence of the samples previously obtained for the first time period corresponding to a third time instance, the third time instance matching the first time instance;
    implementing a global sequence alignment algorithm, by the processing device to determine
        a first score related to alignment between the respective samples of the first sequence of the samples and the second sequence of samples, and
        a second score related to alignment between the respective samples of the first sequence of samples and the third sequence of samples;
    determining whether there is a leak based at least in part on the first score and the second score; and
    automatically transmitting a leak alert to a user device, when a leak is determined.

2. The method of claim 1, further comprising determining whether the samples of the first, second, and third sequences are complete or missing based on a proportion of a number of samples obtained, compared to a number of expected samples for the first time period.

3. The method of claim 2, further comprising determining whether the first, second, and third sequences are valid or invalid, wherein a sequence representing an existing liquid leak is invalid.

4. The method of claim 3, further comprising determining a weight value associated with the first time period, based on the first score, the second score, and indications of missing/complete and valid/invalid associated with the first, second, and third sequences.

5. The method of claim 4, wherein the first and second scores are compared with a threshold to determine whether there is a match or a mismatch between the respective comparisons.

6. The method of claim 4, further comprising determining two or more weights for two or more time periods by sliding the first time period in increments of corresponding two or more time slots relative to the first time instance, and determining an accumulated value of the weights.

7. The method of claim 6, comprising comparing the accumulated value of the weights to a suggested accumulated weight value based on a number of the two or more weights determined, and determining whether there is a liquid leak based on the comparison.

8. The method of claim 1, wherein the processing device is a remote device and receiving the samples from the monitoring device over a wired or wireless medium.

9. The method of claim 8, wherein the remote device is a cloud server.

10. The method of claim 1, wherein the first time instance is from a current time, the second time instance is a day old and the third time instance is a week old.

11. An apparatus configured to detect liquid leaks in a liquid distribution system, the apparatus comprising:
a processing device configured to:
obtain periodic samples of liquid pressure measured at regular time intervals by a monitoring device, from at least a first node of a liquid distribution system;
form at least:
a first sequence of the samples for a first time period corresponding to a first time instance;
a second sequence of the samples previously obtained for the first time period corresponding to a second time instance, the second time instance matching the first time instance; and
a third sequence of the samples previously obtained for the first time period corresponding to a third time instance, the third time instance matching the first time instance;
implement a global sequence alignment algorithm to determine:
a first score related to alignment between the respective samples of the first sequence of the samples and the second sequence of samples, and
a second score related to alignment between the respective samples of the first sequence of samples and the third sequence of samples;
determine whether there is a leak based at least in part on the first score and the second score; and
automatically transmit a leak alert to a user device, when a leak is determined.

12. The apparatus of claim 1, wherein the processing device is further configured to:
determine whether the samples of the first, second, and third sequences are complete or missing based on a proportion of a number of samples obtained, compared to a number of expected samples for the first time period; and
determine whether the first, second, and third sequences are valid or invalid, wherein a sequence representing an existing liquid leak is invalid.

13. The apparatus of claim 12, wherein the processing device is further configured to determine a weight value associated with the first time period, based on the first score, the second score, and indications of missing/complete and valid/invalid associated with the first, second, and third sequences; and
compare the first and second scores with a threshold to determine whether there is a match or a mismatch between the respective comparisons.

14. The apparatus of claim 13, wherein the processing device is further configured to:
determine two or more weights for two or more time periods based on sliding the first time period in increments of corresponding two or more time slots relative to the first time instance;
determine an accumulated value of the weights;
compare the accumulated value of the weights to a suggested accumulated weight value based on a number of the two or more weights determined; and
determine whether there is a liquid leak based on the comparison.

15. A non-transitory computer readable storage medium comprising code, which, when executed by a processor, causes the processor to perform operations for detecting liquid leaks in a liquid distribution system, the non-transitory computer readable storage medium comprising:
code for obtaining periodic samples of liquid pressure measured at regular time intervals by a monitoring device, from at least a first node of a liquid distribution system at which the monitoring device is disposed;
code for forming at least:
a first sequence of the samples for a first time period corresponding to a first time instance;
a second sequence of the samples previously obtained for the first time period corresponding to a second time instance, the second time instance matching the first time instance; and
a third sequence of the samples previously obtained for the first time period corresponding to a third time instance, the third time instance matching the first time instance;
code for implementing a global sequence alignment algorithm, by the processing device to determine
a first score related to alignment between the respective samples of the first sequence of the samples and the second sequence of samples, and
a second score related to alignment between the respective samples of the first sequence of samples and the third sequence of samples;
code for determining whether there is a leak based at least in part on the first score and the second score; and
code for automatically transmitting a leak alert to a user device, when a leak is determined.

* * * * *